(12) United States Patent
Norige et al.

(10) Patent No.: US 9,928,204 B2
(45) Date of Patent: Mar. 27, 2018

(54) TRANSACTION EXPANSION FOR NOC SIMULATION AND NOC DESIGN

(71) Applicant: NetSpeed Systems, San Jose, CA (US)

(72) Inventors: Eric Norige, East Lansing, MI (US); Sailesh Kumar, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 390 days.

(21) Appl. No.: 14/620,642

(22) Filed: Feb. 12, 2015

(65) Prior Publication Data

US 2017/0060805 A1    Mar. 2, 2017

(51) Int. Cl.
*G06F 13/12* (2006.01)
*G06F 13/42* (2006.01)
*H04L 12/721* (2013.01)

(52) U.S. Cl.
CPC .......... *G06F 13/4221* (2013.01); *H04L 45/40* (2013.01)

(58) Field of Classification Search
CPC .......................... H04L 49/109; G06F 15/7825
USPC ....................................................... 710/104
See application file for complete search history.

(56) References Cited

U.S. PATENT DOCUMENTS

| 4,409,838 | A | 10/1983 | Schomberg |
|---|---|---|---|
| 4,933,933 | A | 6/1990 | Daily et al. |
| 5,105,424 | A | 4/1992 | Flaig et al. |
| 5,163,016 | A | 11/1992 | Har'El et al. |
| 5,355,455 | A | 10/1994 | Hilgendorf et al. |
| 5,432,785 | A | 7/1995 | Ahmed et al. |
| 5,583,990 | A | 12/1996 | Birrittella et al. |
| 5,588,152 | A | 12/1996 | Dapp et al. |
| 5,701,416 | A * | 12/1997 | Thorson ............ G06F 15/17381 340/2.1 |
| 5,764,740 | A | 6/1998 | Holender |
| 5,859,981 | A | 1/1999 | Levin et al. |
| 5,991,308 | A | 11/1999 | Fuhrmann et al. |
| 6,003,029 | A | 12/1999 | Agrawal et al. |
| 6,029,220 | A | 2/2000 | Iwamura et al. |
| 6,058,385 | A | 5/2000 | Koza et al. |
| 6,101,181 | A | 8/2000 | Passint et al. |

(Continued)

FOREIGN PATENT DOCUMENTS

CN          103684961 A      3/2014
KR     10-2013-0033898 A1    4/2013

(Continued)

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Titus Wong
(74) *Attorney, Agent, or Firm* — Procopio, Cory, Hargreaves & Savitch LLP

(57) ABSTRACT

Methods and example implementations described herein are generally directed to interconnect architecture, and more specifically, to generation of one or more expanded transactions for conducting simulations and/or NoC design. Aspects of the present disclosure include processing of input traffic specification that is given in terms of groups of hosts, requests, and responses to the requests, in order to generate one or more appropriate/correct expanded transactions that can be simulated.

16 Claims, 13 Drawing Sheets

(56) References Cited

U.S. PATENT DOCUMENTS

| | | | |
|---|---|---|---|
| 6,108,739 A | 8/2000 | James et al. |
| 6,249,902 B1 | 6/2001 | Igusa et al. |
| 6,314,487 B1 | 11/2001 | Hahn et al. |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,590,959 B2 | 9/2009 | Tanaka |
| 7,693,064 B2 | 4/2010 | Thubert et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedl et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 * | 12/2013 | Philip ................. G06F 17/5072 |
| | | 703/15 |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0243147 A1 * | 10/2011 | Paul ........................ H04L 45/60 |
| | | 370/401 |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0155250 A1 | 6/2012 | Carney et al. |
| 2012/0173846 A1 | 7/2012 | Wang et al. |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |

(56) References Cited

U.S. PATENT DOCUMENTS

| | | |
|---|---|---|
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0140341 A1* | 5/2014 | Bataineh ............... H04L 45/20 370/389 |
| 2014/0211622 A1 | 7/2014 | Kumar et al. |
| 2014/0254388 A1 | 9/2014 | Kumar et al. |

FOREIGN PATENT DOCUMENTS

| | | |
|---|---|---|
| WO | 2010074872 A1 | 7/2010 |
| WO | 2013063484 A1 | 5/2013 |
| WO | 2014059024 A1 | 4/2014 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, dated Jul. 10, 2014, 9 pgs.

International Search Report and Written Opinion for PCT/US2014/037902, dated Sep. 30, 2014, 14 pgs.

International Search Report and Written Opinion for PCT/US2014/048190, dated Nov. 28, 2014, 11 pgs.

Hestness, J., et al., Netrace: Dependency-Tracking for Efficient Network-on-Chip Experimentation, The University of Texas at Austin, Dept. of Computer Science, May 2011, 20 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

\* cited by examiner

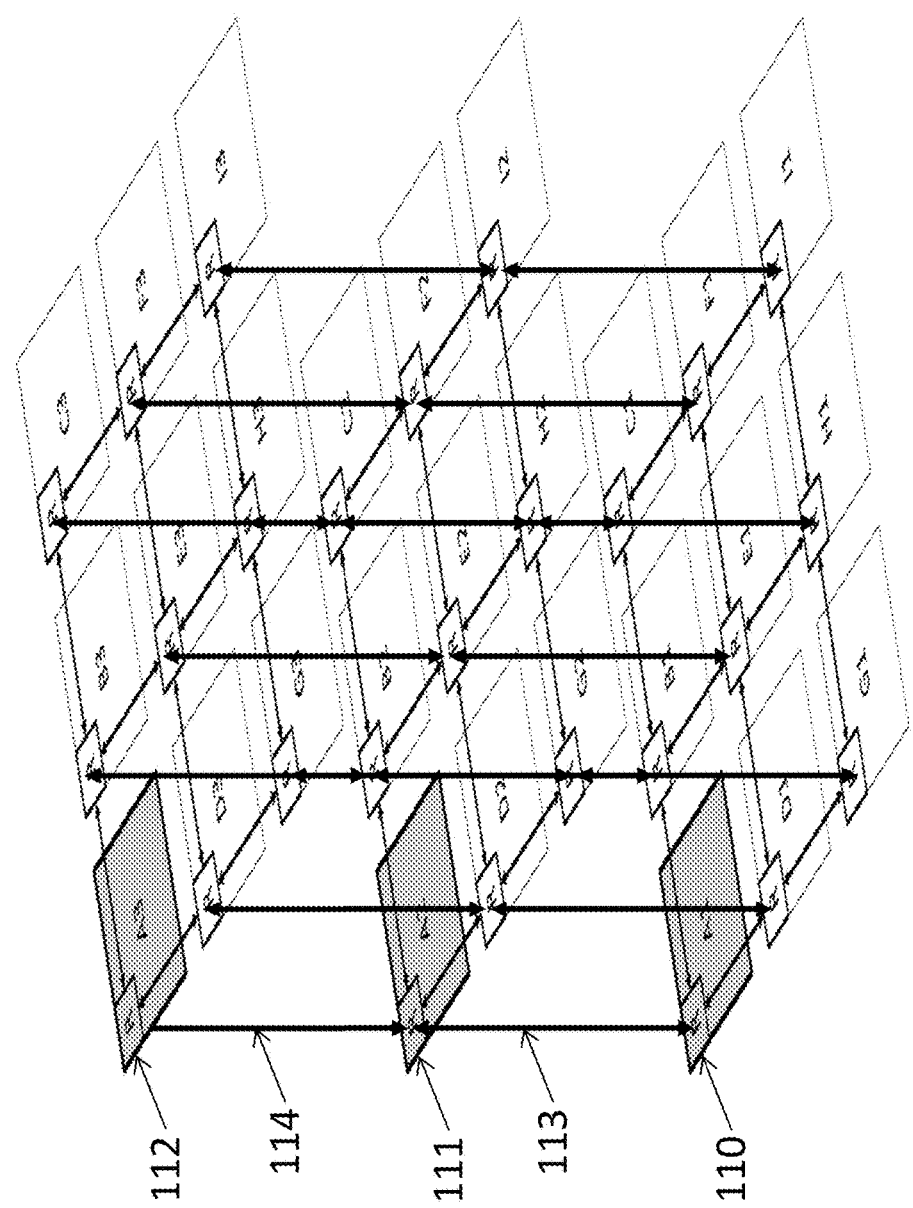
FIG. 1(d) --RELATED ART--

TRANSACTION EXPANSION FOR NOC SIMULATION AND NOC DESIGN

BACKGROUND

Technical Field

Methods and example implementations described herein are generally directed to interconnect architecture, and more specifically, to generation of one or more transactions for conducting simulations and/or NoC design.

Related Art

The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer which is then routed to the destination on the same NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers of different layers, wherein, for instance, a router connected to host in the first layer is shown as R1, and a router connected to the same host in the second layer is shown as R2. In this example, the multi-layer NoC is different from the 3D NoC. In this case multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right combination of routers, channels, and interconnections for a given system remains a challenge and time consuming manual process, often resulting in sub-optimal and inefficient designs.

System on Chips (SoCs) are becoming increasingly sophisticated, feature rich, and high performance by integrating a growing number of standard processor cores, memory & I/O subsystems, and specialized acceleration IPs. To address this complexity, the Network-on-Chip (NoC) approach of connecting SoC components is gaining popularity. A NoC can provide connectivity to a plethora of components and interfaces and simultaneously enable rapid design closure by being automatically generated from a high level specification. The specification describes the interconnect requirements of the SoC in terms of connectivity, bandwidth and latency. In addition to this, information such as position of various components, protocol information, clocking and power domains, etc. may be supplied. A NoC compiler can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters.

FIG. 4(a) illustrates an exemplary system 400 with two hosts and two flows represented as an exemplary flow-level specification. Such flow-level specifications are usually in the form of an edge-weighted digraph, where each node in the graph is a host in the network, and where edges represent traffic sent from one node to another. Furthermore, weights indicate the bandwidth of the traffic. Such a specification is sometimes annotated with latency requirements for each flow, indicating a limit on transfer time. System 400 illustrates connection between a first host such as a CPU 402 and a second host such as a memory unit 404 with two traffic flows (406 and 408) between them, wherein the first flow is a 'load request' 406 from CPU 402 to memory 404, and the second flow is 'load data' 408 sent back from memory 404 to CPU 402.

This traffic flow information is described in the specification of the NoC and is used for designing and simulating the NoC. The specification that describes the flow level information may be called hereafter as flow-level specification. The known flow level specifications may have the following two limitations in addition of other un-cited limitations. The first limitation of the known flow level specification is that the information included therein may not be enough for creating a deadlock free routing between hosts of SoC through the NoC. Though the flow level specification includes information on external dependencies between ports of different hosts, information on internal dependencies of hosts and/or messages/packets are not included. The second limitation of flow level specification is that network simulations performed using point to point traffic represented by the flows in flow level specification may not be sufficient enough, or may be inaccurate because of other missing information such as the inter-dependency information. Flow-based simulation allows each host to transmit packets independent of other hosts' behavior. The traffic correlation caused by the request/response protocols may have a significant impact on network behavior.

Existing systems undertake simulation based on groups of entities such as groups of hosts, groups of requests, and groups of responses to requests, without taking into account the sequential flow of packet/message/flit and state of flow of packets/flits. Existing simulation systems also require the endpoints to know, on the fly, as to where the packet came from and where the processed packet is to be sent to, increasing the simulation cost. There is therefore a need in the art to improve the efficiency of transaction simulation by enabling the traffic to know the state of transaction, flow structure to be followed, among other aspects.

SUMMARY

Methods and example implementations described herein are generally directed to interconnect architecture, and more specifically, to generation of one or more expanded transactions for conducting simulations and/or NoC design. Aspects of the present disclosure include processing of input traffic specification that is given in terms of groups of hosts such as CPU's/caches/cache controllers/DMA's/memories, requests, and responses to the requests, in order to generate one or more appropriate/correct transactions that can be simulated.

The present disclosure is directed to a method of generating one or more transactions from a group-based input traffic specification by expansion of the input specification into one or more transactions. Each transaction, an in example embodiment, can include a plurality of hops between multiple hosts, wherein each hop represents a message sent from one host to another. In an aspect, method of the present disclosure includes the step of determining, for each transition/hop in a given transaction flow, hop type for the respective hop based on say the message type of the flow from one host to another such as whether the message type is load request type or load response type. In an aspect, the load request can give full flexibility to the transmitting host to send the message to any other host, whereas the load response can be constrained in terms of the hosts to which the response can be sent such as the receiving host can be constrained to send the response back to the sender host. In another example aspect, the hop type can include "New", "Old", and "All", wherein "New" can indicate that the message can be forwarded to any new host that has not been sent to before in the current transaction, "Old" can indicate that the message can only be forwarded to an old/defined host that has been a part of the transaction, and "All" can indicate that the message can be sent to any host without any constraint. In another aspect, the hop type can be determined based on the request/transaction structure so as to evaluate whether the hop type is of request type (typically with no constraints) or of response type (with constraints). In yet another aspect, the hop type (for instance "New", "Old", and "Any") can be determined based on singletons, wherein one or more singleton endpoints can be configured to define and configure transaction structures to override earlier transaction hops. In yet another embodiment, the hop type can also be configured to be selected randomly as "Any" type of transaction. In an aspect, method of the present disclosure can further include using the determined hop types to generate actual instances of the transaction. In an aspect, generation of each instance for a given hop type can include creation of one partial transaction for each initial transmitter, and, for each partial transaction, extending one hop by filtering destinations based on hop type and/or partial transactions, wherein for each destination, partial transactions with that destination and its corresponding source can be made.

The present disclosure is also directed to a non-transitory computer readable medium storing instructions for executing a process, the instructions comprising generating one or more transactions from a group-based input traffic specification by expansion of the input specification into one or more transactions. Each transaction, an in example embodiment, can include a plurality of hops between multiple hosts, wherein each hop represents a message sent from one host to another. In an aspect, method of the present disclosure includes the step of determining, for each transition/hop in a given transaction flow, hop type for the respective hop based on say the message type of the flow from one host to another such as whether the message type is load request type or load response type. In an aspect, instructions of the present disclosure can also be configured to use the determined hop types to generate actual instances of the transaction. In an aspect, generation of each instance for a given hop type can include creation of one partial transaction for each initial transmitter, and, for each partial transaction, extending one hop by filtering destinations based on hop type and/or partial transactions, wherein for each destination, partial transactions with that destination and its corresponding source can be made.

The foregoing and other objects, features and advantages of the example implementations will be apparent and the following more particular descriptions of example implementations as illustrated in the accompanying drawings wherein like reference numbers generally represent like parts.

BRIEF DESCRIPTION OF THE DRAWINGS

FIGS. 1(a), 1(b) 1(c) and 1(d) illustrate examples of Bidirectional ring, 2D Mesh, 2D Torus, and 3D Mesh NoC Topologies.

DETAILED DESCRIPTION

Figure 1A:
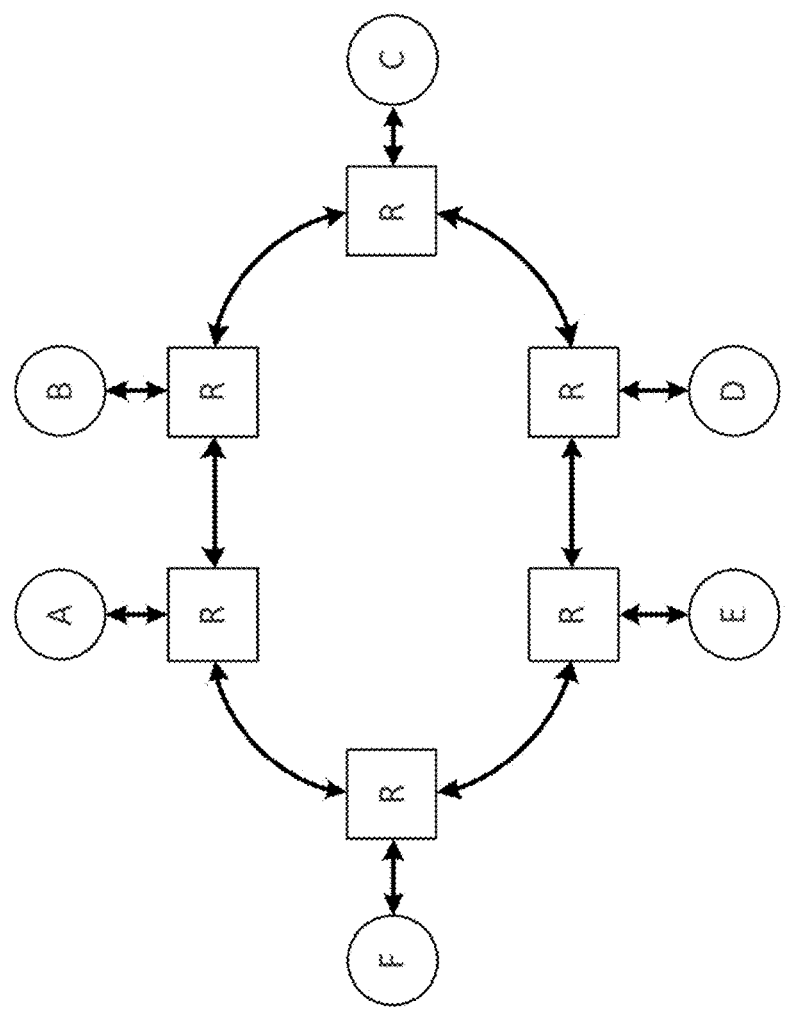
Figure 1B:
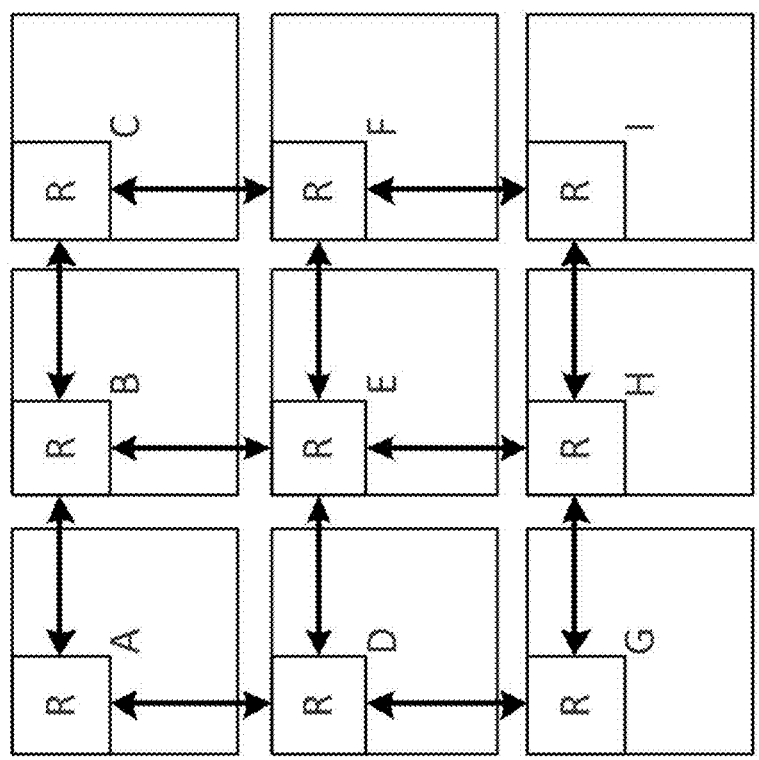
Figure 1C:
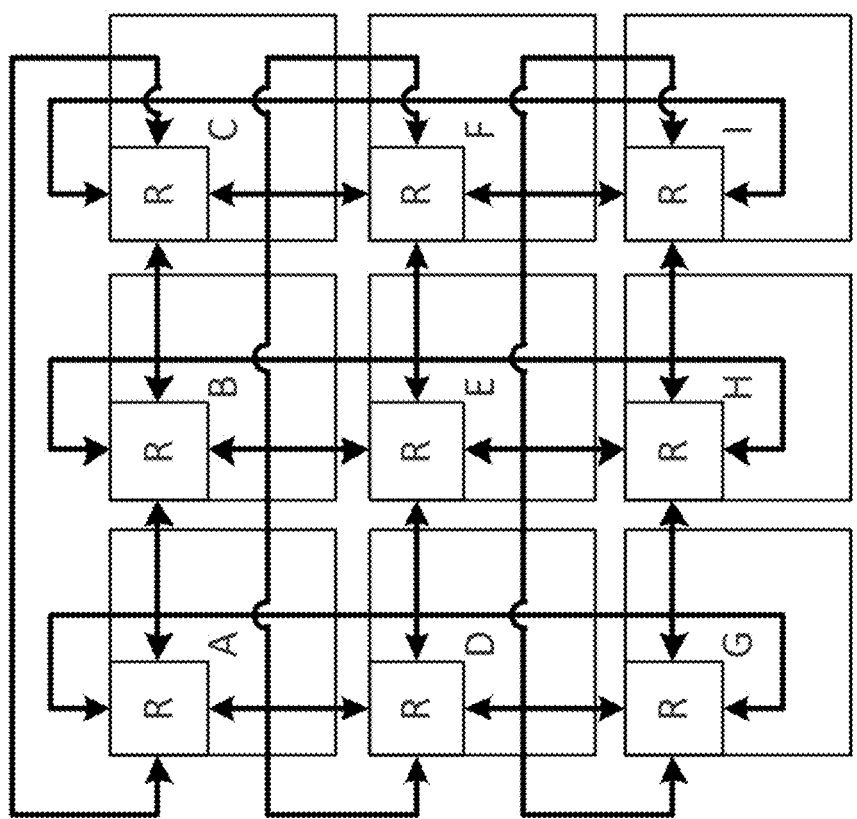
Figure 2A:
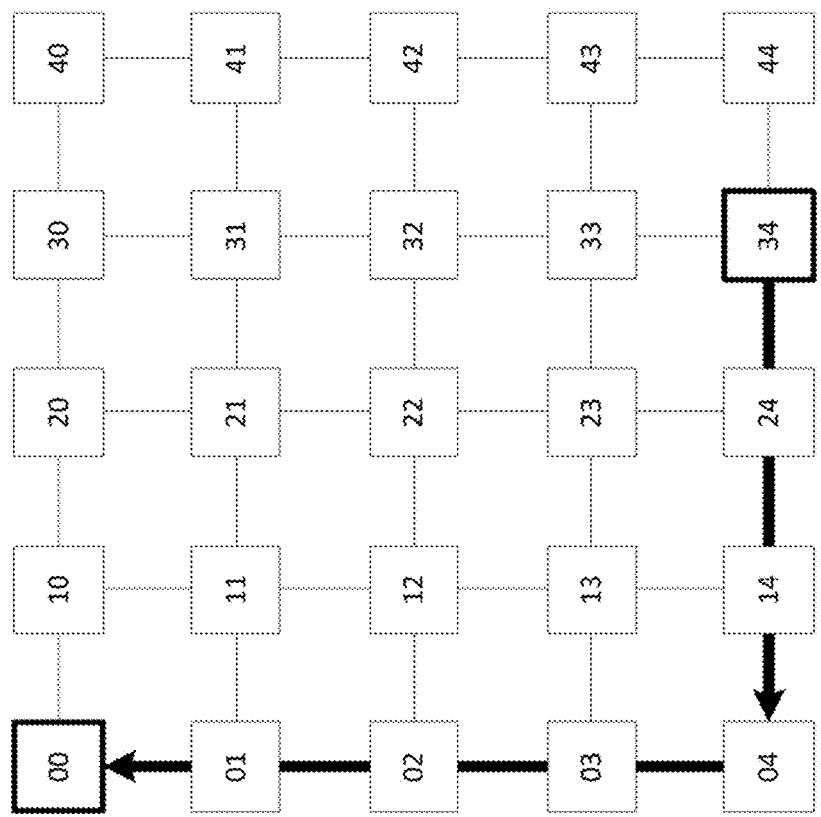
FIG. 2(a) illustrates an example of XY routing in a related art two dimensional mesh.
Figure 2B:
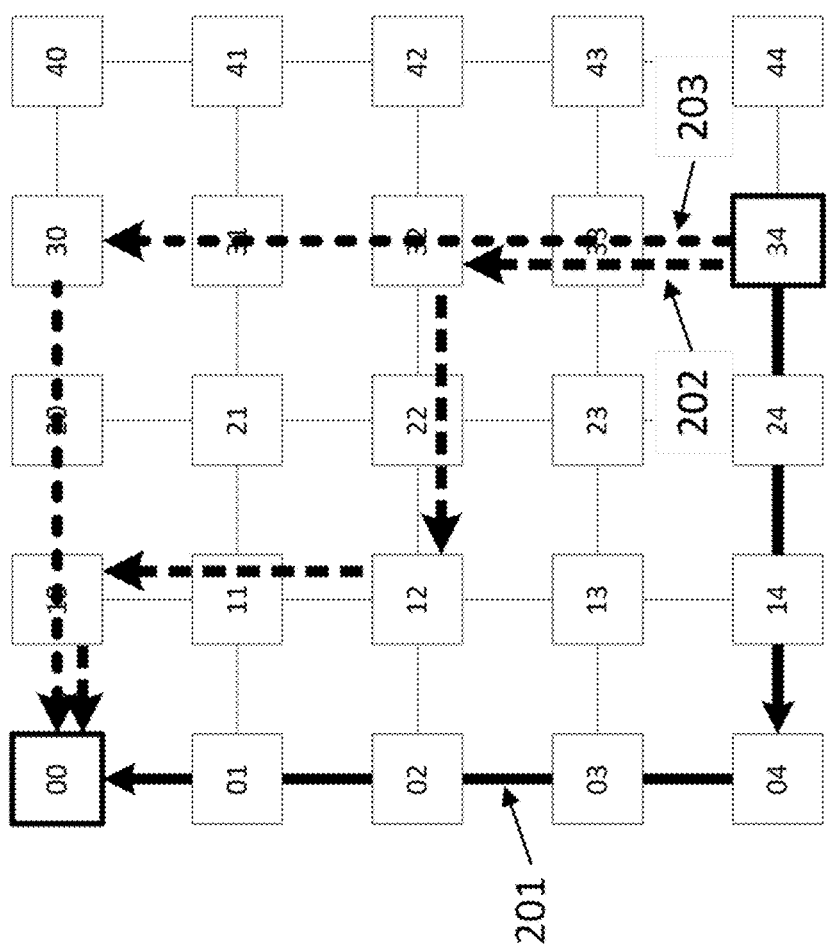
FIG. 2(b) illustrates three different routes between a source and destination nodes.
Figure 3A:
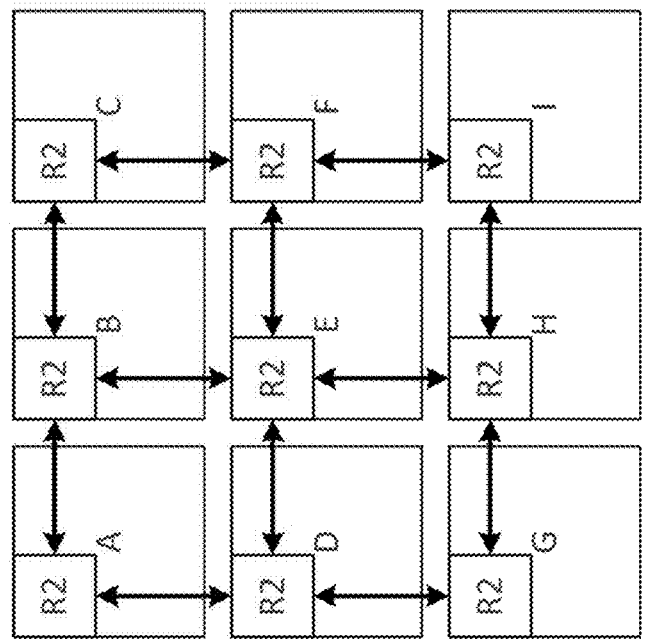
FIG. 3(a) illustrates an example of a related art two layer NoC interconnect.
Figure 3A:
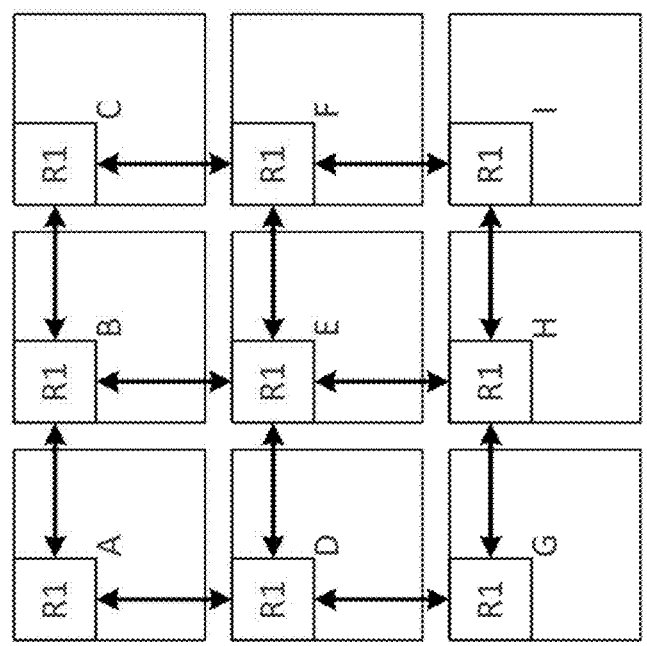
Figure 3B:
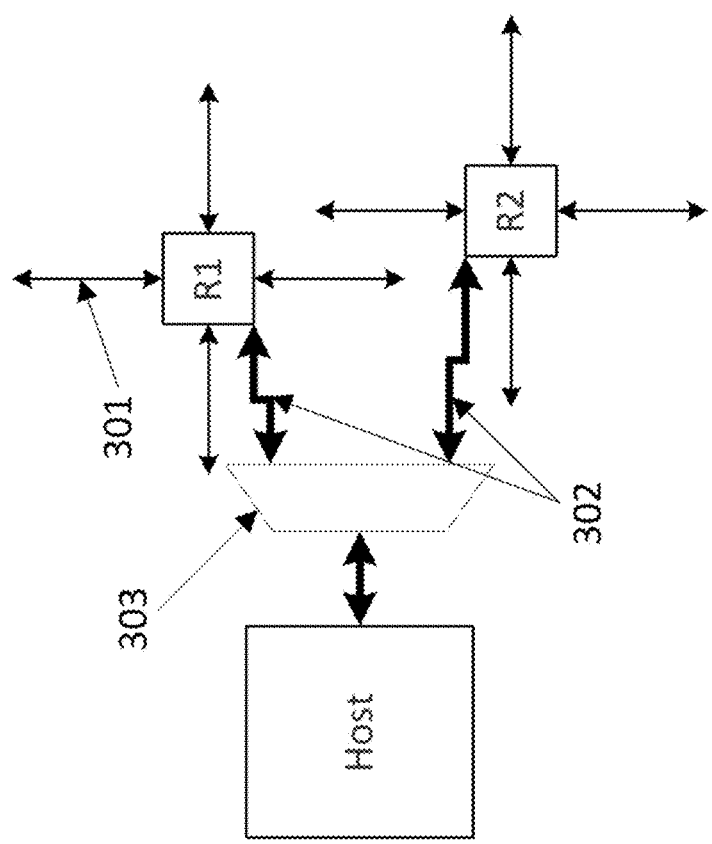
FIG. 3(b) illustrates the related art bridge logic between host and multiple NoC layers.
Figure 4:
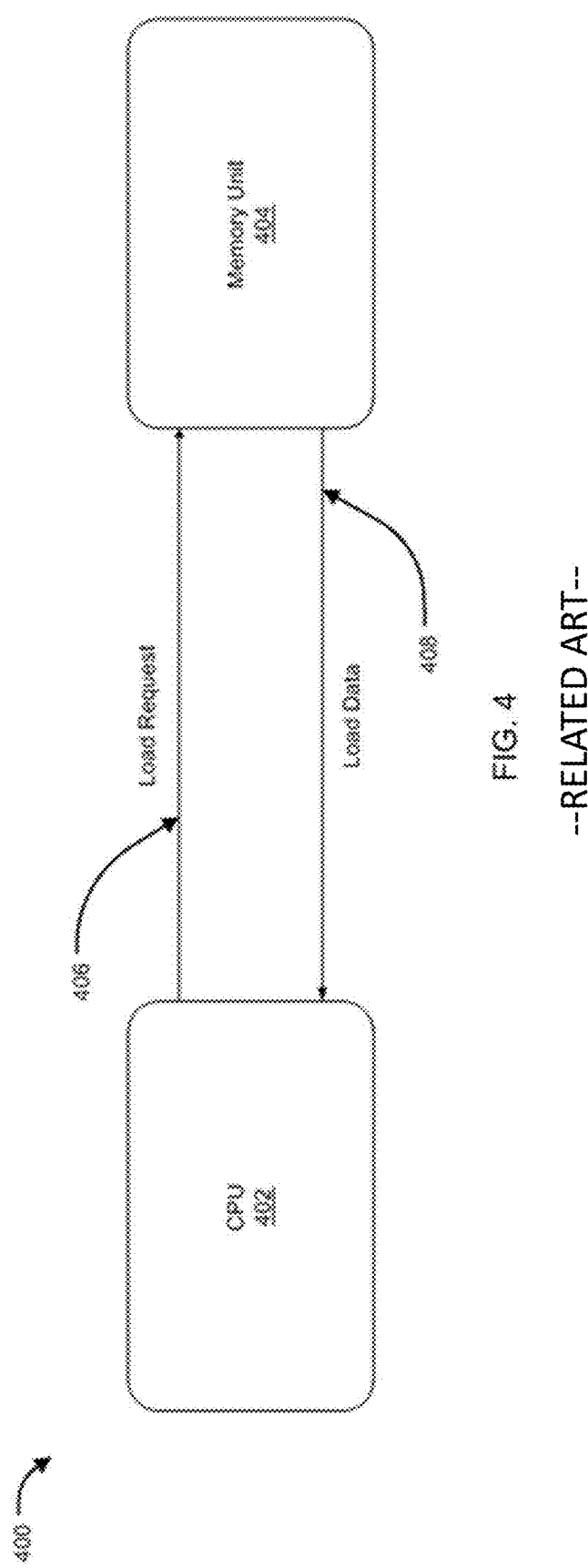
FIG. 4 illustrates an exemplary system with two hosts and two flows represented according to an exemplary flow-level specification.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Methods and example implementations described herein are generally directed to interconnect architecture, and more specifically, to generation of one or more transactions for conducting simulations and/or NoC design. Aspects of the present disclosure include processing of input traffic specification that is given in terms of groups of hosts such as CPU's/caches/cache controllers/DMA's/memories, requests, and responses to the requests, in order to generate one or more appropriate/correct transactions that can be simulated.

The present disclosure is directed to a method of generating one or more transactions from a group-based input traffic specification by expansion of the input specification into the one or more transactions. Each transaction, an in example embodiment, can include a plurality of hops between multiple hosts, wherein each hop represents a message sent from one host to another. In an aspect, method of the present disclosure includes the step of determining, for each transition/hop in a given transaction flow, hop type for the respective hop based on the message type of the flow from one host to another such as whether the message type is load request type or load response type. In an aspect, the load request can give full flexibility to the sending host to send the message to any other host, whereas the load response can be constrained in terms of the hosts to which the response can be sent such as the receiving host can be constrained to send the response back to the sender host. In another example aspect, the hop type can include "New", "Old", "First" and "All", wherein "New" can indicate that the message can be forwarded to any new host that has not been sent to before in the current transaction, "Old" can indicate that the message can only be forwarded to an old/defined host that has been a part of the current transaction, "first" can indicate that the message can only be forwarded to the initiating bridge, and "All" can indicate that the message can be sent to any host without any constraint.

In another aspect, the hop type can be determined based on the request/transaction structure so as to evaluate whether the hop type is of request type (typically with no constraints) or of response type (with constraints). In yet another aspect, the hop type (for instance "New", "Old", "First", and "Any") can be determined based on singletons, wherein one or more singleton endpoints can be configured to define and configure transaction structures to override earlier transaction hops. In yet another embodiment, the hop type can also be configured to be selected without constraint as "Any" type of transaction. In an aspect, the method of the present disclosure can further include using the determined hop types to generate actual instances of the transaction.

In an aspect, the generation of each instance for a given hop type can include creation of one partial transaction for each initial transmitter, and, for each partial transaction, extending one hop by filtering destinations based on hop type and/or partial transactions, wherein for each destination, partial transactions with that destination and its corresponding source can be made.

The present disclosure is also directed to a non-transitory computer readable medium storing instructions for executing a process, the instructions comprising generating one or more transactions from a group-based input traffic specification by expansion of the input specification into one or more transactions. Each transaction, an in example embodiment, can include a plurality of hops between multiple hosts, wherein each hop represents a message sent from one host to another. In an aspect, method of the present disclosure includes the step of determining, for each transition/hop in a given transaction flow, hop type for the respective hop based on say the message type of the flow from one host to another such as whether the message type is load request type or load response type. In an aspect, instructions of the present disclosure can also be configured to use the determined hop types to generate actual instances of the transaction. In an aspect, generation of each instance for a given hop type can include creation of one partial transaction for each initial transmitter, and, for each partial transaction, extending one hop by filtering destinations based on hop type and/or partial transactions, wherein for each destination, partial transactions with that destination and its corresponding source can be made.

The present example implementations are related to traffic simulation and design which include expansion of valid sequences based on a traffic specification. Examples of traffic specifications can be found, for example, in U.S. patent application Ser. No. 14/298,717, herein incorporated by reference in its entirety for all purposes.

Figure 5:
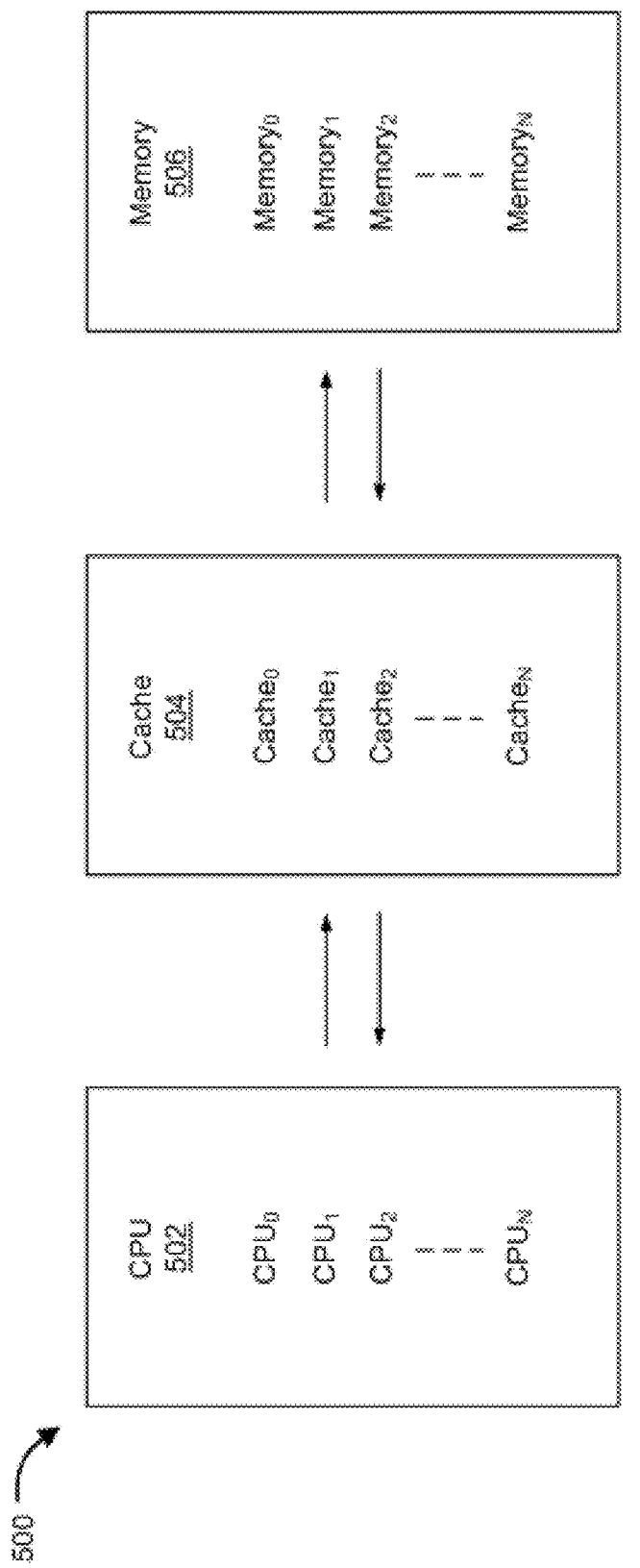
FIG. 5 illustrates an exemplary group level transaction input.

For illustrative purposes, FIG. 5 illustrates an exemplary group level transaction input, wherein multiple CPU's 502 can be configured to send/receive messages to/from multiple caches 504, which in turn can be configured to send/receive messages to/from memories 506, wherein such group level transaction input does not take into account the sequence of packet flow or aspects relating to delay and ensuring that the requesting CPU gets the requested data after processing from intermediate hosts. Aspects of the present disclosure therefore enable group level transaction input to be expanded into a plurality of transactions, wherein each transaction is a group of messages that flow from one host to another and then to another by means of hops, and wherein such expanded transactions can be then be used for traffic specification simulation and design of Network-On-Chip (NoC). For instance, following two exemplary transactions can be generated from a group of 3 CPUs ($CPU_0$, $CPU_1$, and $CPU_2$), 3 Caches ($Cache_0$, $Cache_1$, and $Cache_2$), and 3 Memories ($Memory_0$, $Memory_1$, $Memory_2$).

Figure 6:
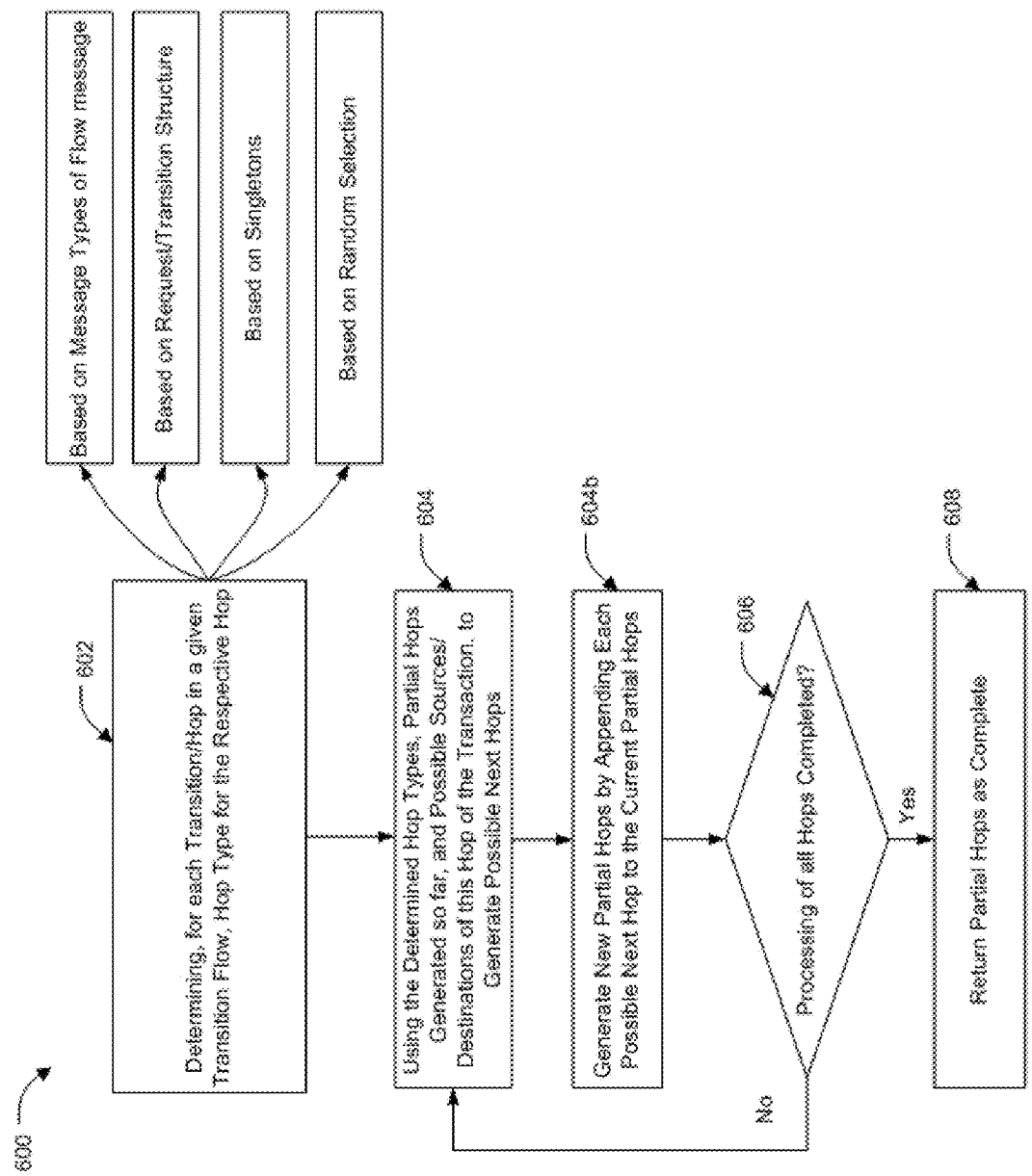
FIG. 6 illustrates an exemplary method for generation of expanded transactions in accordance with an embodiment of present disclosure.

$CPU_0 \rightarrow Cache_1 \rightarrow Memory_0 \rightarrow Cache_1 \rightarrow CPU_0$ $CPU_1 \rightarrow Cache_2 \rightarrow Memory_1 \rightarrow Cache_2 \rightarrow CPU_1$ The proposed system and method can therefore ensure that the sequence of message flow is maintained by enabling the requestor to send a load request and the same requests to eventually receive the load response to the request, making following exemplary transaction as erroneous:

$CPU_0 \rightarrow Cache_1 \rightarrow Memory_0 \rightarrow Cache_2 \rightarrow CPU_1$ Aspects of the present disclosure also enable transaction simulation to be performed such that, instead of the node points, the traffic itself is pre-programmed with the hop/message sequence, without maintaining additional information such as state information of the previous requesting hosts, type of message requests, type of hops, request structure, among other attributes/parameters, but instead storing a pre-computed next message in the sequence. For instance, in a typical transaction the message can flow, say from A→B→C→B→\A, wherein A can send a first message (through first hop) to B, B can send a second message (through second hop) to C, C can send a third message (through third hop) to B, and B can send a fourth message (through fourth hop) to A. In an example embodiment, in such a case, A host can be a requester having a query (Q) message to B, which in turn can send another query/request message (Q) to C, wherein C can process the message and send a reply/response (R) to B's query (Q), and B can then send a response (R) based on the response from C to A. A sequence of 4 related messages can be pre-computed to trigger this behavior in simulation, for instance W→X→Y→Z, where W is the query message from A to B, X is the query message from B to C, Y is the response from C to B and Z is the response from B to A. By relating the messages so each message knows the next, the receiving node can just send the next message in the sequence without significant processing. According to one embodiment, in an example implementation, a message type "request" can be allowed to go anywhere, i.e. to any host, whereas the message type "response" can be constrained to go back to the requester. FIG. 6 illustrates an exemplary method 600 for generation of expanded transactions in accordance with an embodiment of present disclosure. As mentioned above, in an example architecture, each transaction can include a plurality of hops between multiple hosts, wherein each hop represents a message sent from one host to another.

At step 602, method of the present disclosure can include determining, for each transition/hop in a given transaction flow, hop type for the respective hop based on, say the message type of the flow message from one host to another such as whether the message type is of "load request" type or of "load response" type. In an example aspect, the load request can give full flexibility to the sending host to send the message to any other host, whereas the load response can be constrained in terms of the hosts to which the response can be sent such as, for instance, the receiving host can be constrained to send the response back only to the sender host. In another example aspect, the hop type can include "New", "Old", and "All", wherein "New" can indicate that the message can be forwarded to any new host that has not participated in the current transaction, "Old" can indicate that the message can only be forwarded to an old/defined host that has been a part of the transaction, and "All" can indicate that the message can be sent to any host without any constraint. In another aspect, the hop type can be determined based on the request/transaction structure so as to evaluate whether the hop type is of request type (typically with no constraints) or of response type (with constraints). In yet another aspect, the hop type (for instance "New", "Old", and "Any") can be determined based on singletons, wherein one or more singleton endpoints can be configured to define and configure transaction structures to override earlier transaction hops. In yet another embodiment, the hop destination can also be configured to be selected randomly as "Any" type of transaction.

At step 604, method of the present disclosure can further include using the determined hop types to generate actual instances of the transaction. In an aspect, generation of each instance for a given hop type can include 1) creation of one partial transaction for each initial transmitter, and, 2) for each partial transaction, filtering possible destinations from the transaction based on the current hop type and/or the properties of the partial transaction being extended.

At step 604b, extending that transaction one hop by, for each allowed destination, appending that destination and its corresponding source to the partial transaction to make a new partial transaction.

At step 606, it is checked if more hops are present, wherein in case more hops are present, the method goes back to step 604 to further extend all partial hops, else, if the processed hop was the last hop, at step 608, all partial hops can be returned as complete transactions.

Figure 7:
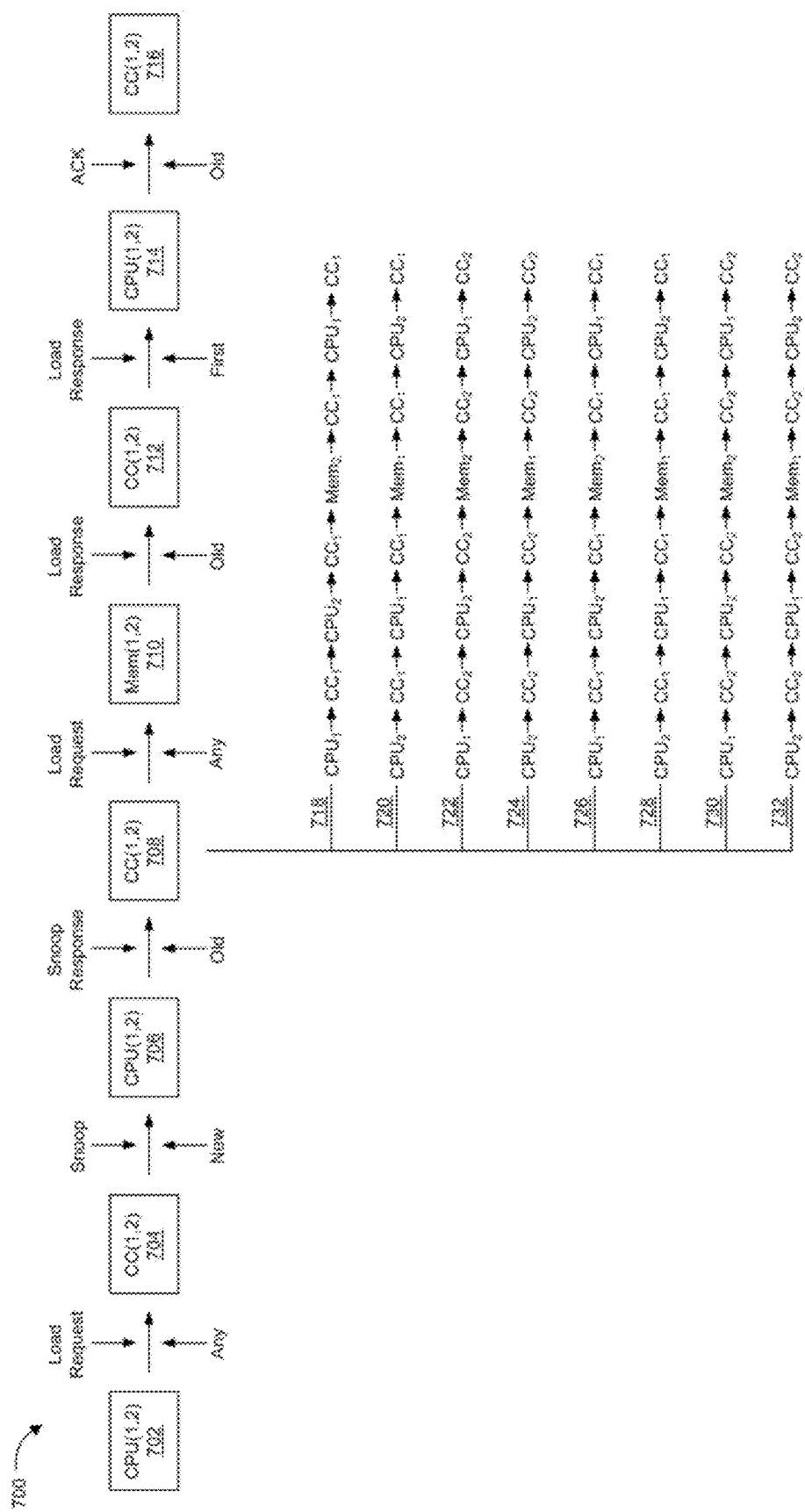
FIG. 7 illustrates an example traffic specification in accordance with an embodiment of the present disclosure.

FIG. 7 illustrates an exemplary traffic specification 700 in accordance with an embodiment of the present disclosure. As can be seen, CPU (1, 2) 702 can be configured to make a "New" hop type request to a Coherency Controller (CC) (0, 1) 704, say CC-0 to check for presence of some content, wherein CC-0 at 704 can then send a snoop message of "New" type to a new CPU (1, 2) 706 to check if the requested data is available. One should appreciate that although "New" type of hop message are being made in the instant case, even "All" hop type based requests can also be made, where the snoop message can be sent to any CPU from amongst the group of CPU's. For instance, in case the original request was made by CPU-1 at 702, the snoop request of "New" can be sent to CPU-2, which can then, at 706, process the snoop message and respond back with an "Old" hop type to same CC-0 that made the request at 708. In an instance, in case the content/data is not present in the CPU-2, CC-0 can then make a "New" hop type load request to a memory (0, 1) 710, wherein the memory at 710 can then reply back with an "Old" hop type to the requesting CC-0 at 712, which in turn can then send a reply back with an "Old" hop type to the requesting CPU-1 at 714. According to one embodiment, once the requesting CPU-1 receives the response as load data from the CC-0, an acknowledgement message of "Old" hop type can be sent back to the CC-0 at block 716. "New" hop type therefore relates to messages that are sent to new hosts that have not been sent messages earlier in the transaction, whereas "Old" hop type relates to messages that are sent to hosts that have been previously sent messages or have participated in the transaction.

According to one embodiment, based on the above mentioned traffic specification, multiple different expanded transactions can be generated such as shown in 718, 720, 722, 724, 726, 728, 730, and 732 which show different expanded transactions that maintain the sequence of flow across hosts. As seen, transaction 718 shows CPU-0 making a request to CC-3, which can then make a "New" hop request to, say CPU-1 or CPU-2, which can then respond back with a "Old" hop response to CC-3. CC-3 can then make a New hop type request to Mem-0, which can in turn make a "Old" hop response to CC-3 to enable CC-3 to send a "Old" hop type message to CPU-0, based on which CPU-0 can send an acknowledgement to CC-0. Similarly, other transactions 720, 722, 724, 726, 728, 730 and 732 can be expanded and processed.

According to one embodiment, while sending messages of hop type "Old", history of previous messages, their contexts, chain of requesters, state of transaction, hosts waiting for a response, among other information indicative of from where and for what/whom the message arrived, can be used by a current host to determine the next hop. A linear or a stack-based history can therefore be determined in order to track the earlier sequence of messages and the hosts involved therein. In a stack based history, the lowermost stack, in an instance, can include the original requester of the message, say CPU-1, whereas the second level stack can include CC-0 to which the CPU-1 sent the load request message, wherein CC-0 then sends the load request message to CPU-2 and/or to memory, and therefore both CPU-2 and/or to memory can be configured at the third level stack.

According to one aspect of the present disclosure, in a transaction simulator, when a transaction is initiated or the start of simulation, the whole sequence can be created and stored such that the complete transaction is ready before the first request message is sent by the first requester. In an aspect, midpoints can be configured to receive the message that has the pointer to the next message to be sent. In another aspect, a situation can also arrive wherein a first bridge receives a message and then the response to that message can be given by another bridge, and therefore the next message to be transmitted can be queued to enable the message to be sent by the transmitter after a defined delay. According to one embodiment, the delay can be configured such that a transmitting host should not send a message to a receiving host until a defined delay period is over, wherein the delay period can be the processing delay that is incurred by the host that processes the respective message. According to another embodiment, all the transactions can be created before the simulation is run, or can be created on the run as well. Created instructions can also be re-run repeatedly.

According to another embodiment, hop type for a given message can also include "implicit" hop type, wherein it is implicitly assumed that the message would be replied back to the requesting host. In another embodiment, a user can also define transactions or parts thereof that need full expansion or can specify exactly how or to whom the response is to be sent. A user can therefore explicitly define and/or change a given specification, say to from a first host to a second host to a third host along with indicating say the hop message type, based on which the transaction can be simulated. For instance, a user can explicitly define that CPU-1 should send a request message to CC-0, which should in turn send a request message to CPU-2 without really specifying the actual hop type such as "Any", "New", or "Old", and in which case even the message does not need to remember or keep a stack trail of previous requesters. A user can also state that the CPU-2 can send a response to anyone except CC-1. Therefore, the user can explicitly define any other type of message transaction sequence or traffic type, or traffic route, or any other constraint, giving rise to possibility of generation of any new hop type desired by the user.

For purposes of NoC design, more accurate point-to-point bandwidth requirement of each pair of endpoints can be computed based on the valid traffic sequences. Attempting to directly use grouped-endpoint transaction bandwidths for NoC design will easily over-provision or under-provision bandwidth, as the number of flows from a source to a destination will be hard to predict. Instead, the bandwidth requirements of the grouped-endpoint transaction should determine the bandwidth requirements of each hop of the valid transactions and then these bandwidths processed by a function to produce the bandwidth requirement for each pair of endpoints. One example function to process these bandwidth requirements is adding them up. Another example is taking the maximum.

Using FIG. 7 as an example, the bandwidth from CPU1 to CC1 could be incorrectly computed from the 3 hops in the grouped-endpoint transaction that can expand to CPU1→CC1. Examining the 8 expanded transactions, we find that there are total 6 hops where CPU1 sends to CC1: trans. 722 hop 1, trans. 722 hop 7, trans. 724 hop 3, trans. 726 hop 1, trans 726 hop7 and trans 728 hop 3. The correct design bandwidth requirement comes from the requirements for these 6 hops by applying a function.

The function to compute bandwidth requirements for a link from the chains going over that link can be implemented in various ways, according to the desired implementation. For example, such a function can involve adding the bandwidth requirements for each of those chains. If analyzing peak bandwidths, the function to compute the net requirement can report the maximum requirement for each chain. In a NoC context, the hops of a chain can traverse the same link multiple times, so considering paths of each hop may result in a multiple of the chain bandwidth being included in the computation. Finally, chains may be assigned to various traffic profiles, to indicate which chains may be simultaneously active. A function that takes this into account could add the rates of chains within each profile and take the maximum rate total across all profiles as its result.

Figure 8A:
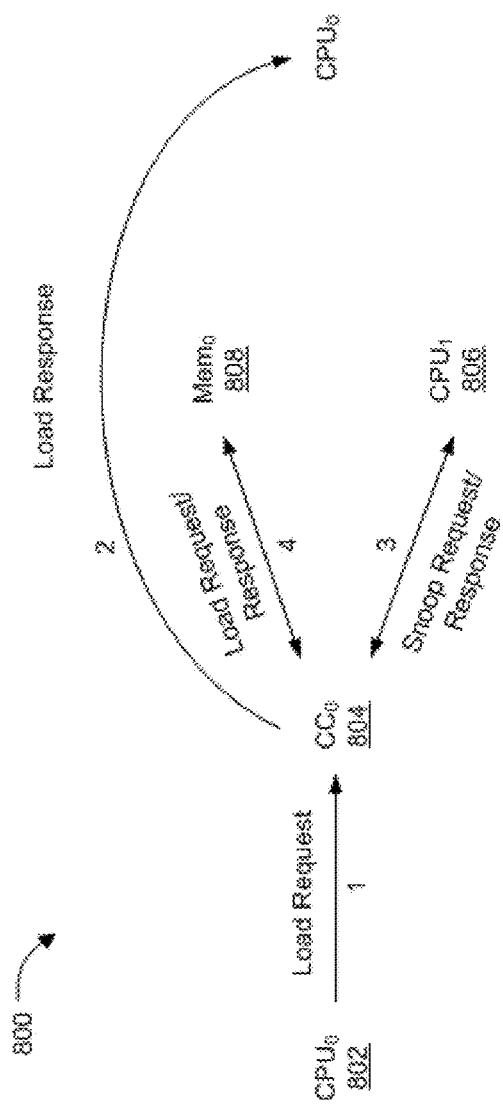
FIGS. 8(A) and 8(B) illustrate example non-linear transactions in accordance with embodiments of the present disclosure.

FIG. 8(A) illustrates an exemplary non-linear transaction 800, wherein once a coherency controller 804 receives a load request from CPU-0 802, the CC 804 can send two different requests, one to CPU-1 806 and the second to memory MEM-0 808 so that the CC 804 does not have to wait for the CPU-1 806 to respond back stating that the data requested by the CPU-0 802 is not available. Based on the response from CPU-1 806 and/or MEM-0 808, the CC 804 can then send a response back to the CPU-0 802. Aspects of the present disclosure can therefore allow expanding transactions by means of branching, and then enabling the branched transaction to converge. Non-linear transaction can therefore be defined as a directed trigger graph where some of the message hops are forked/diverging and then connected thereafter with each other so as to form a logically set of connected edges.

Figure 8B:
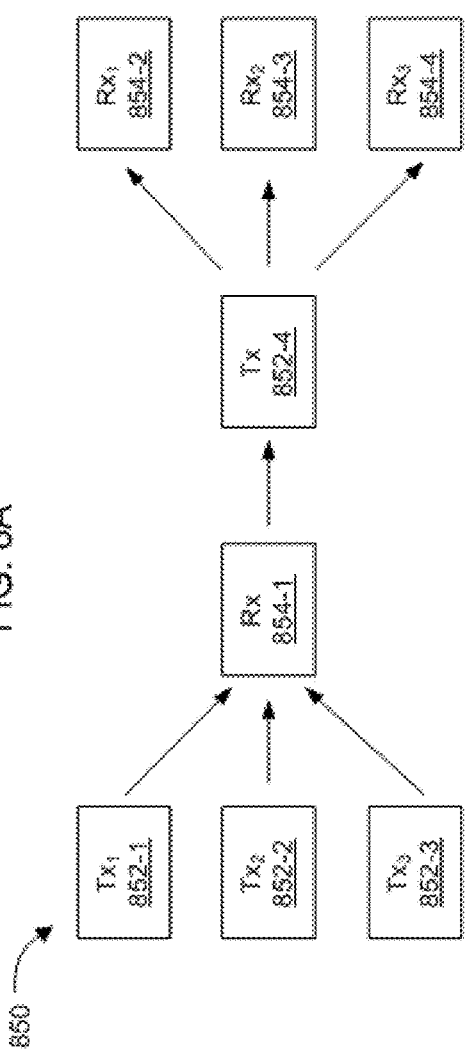

FIG. 8(B) illustrates another exemplary non-linear bipartite transaction flow 850 having a plurality of transmit interfaces such as 852-1, 852-2, and 852-3, and a receive interface 854-1. The receive interface 854-1 can have multiple concurrent incoming messages (shown as incoming edges) trigger a single processing event, represented by the edge between 854-1 and 852-4. Then it can send concurrent responses to one or more receive interfaces such as 854-2, 854-3 and 854-4. Many kinds of nonlinear transactions can be represented with a connected, directed, bi-partite multigraph like 850. A transmit interface with multiple outgoing edges can represent multicast (sending messages to many destinations simultaneously) or broadcast (sending messages to all destinations simultaneously). A receive interface with multiple incoming edges can represent the gather phase of a scatter-gather operation, where messages from a multiplicity of sources are needed before a certain processing can begin. Multiple edges between the same endpoints can describe multiple messages being sent from same source to destination in a single transaction. Any other number of such bi-partite nodes 852/854 with any number of edges can therefore be configured in an aspect of the present disclosure.

One should appreciate although the present disclosure has been explained with reference to load data request, snoop response, load data response, among other types of responses, any other type of message/architecture/interface can completely be incorporated and is well within the scope of the present disclosure. Therefore, in the present disclosure, the proposed loads/stores are in terms of AMBA interfaces but the specification in implementation can be of any interface, until the time they are marked as request/response interfaces and relationships there between. One should also appreciate that although the present disclosure has been explained with reference to the transaction expansion being used for NoC simulation, it can also be used for NoC design, wherein during design, the transaction can first be expanded into multiple transactions and then use the expanded set of transactions to design the NoC.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method, comprising:
   for a traffic specification comprising one or more transactions, each of the one or more transactions being specified using one or more groups of transmitting and receiving interfaces, wherein at least one of the one or more groups comprises a plurality of transmitting and receiving interfaces, identifying one or more valid sequences of messages between individual ones of the transmitting and receiving interfaces that can occur during Network on Chip (NoC) system operation, the identifying the one or more valid sequences of messages comprising:
      for each transaction of the one or more transactions:
         for each of the one or more groups in the each transaction, determining the individual ones of the transmitting and receiving interfaces from the each of the of the one more groups in the each transaction;
         generating one or more valid instances of the each transaction from the individual ones of the transmitting and receiving interfaces for the each of the one or more groups of the each transaction; and
         including the one or more valid instances of the each transaction in the valid sequences of messages.

2. The method of claim 1, wherein the identifying the one or more valid sequences of messages is based on determining hop types for each hop of the transactions.

3. The method of claim 2, wherein the determining hop types is based on at least one of a message type, identifying request and response pairs, identifying singleton endpoints, and definition provided in the traffic specification.

4. The method of claim 1, wherein the identifying the one or more valid sequences of messages comprises extending partial sequences based on destination filtering.

5. The method of claim 1, further comprising determining bandwidth requirements of the traffic specification for NoC design based on valid sequences and a bandwidth combining function.

6. The method of claim 1, further comprising providing instructions to a simulation tool based on conversion of the valid sequences into related messages.

7. The method of claim 6, wherein the instructions provided to a simulation tool utilize only a subset of the valid sequences.

8. The method of claim 1, wherein the one or more groups are marked to indicate the use of at least one of multicast, broadcast, and scatter-gather patterns, wherein the valid sequences comprise at least one of a valid multicast, broadcast, and scatter-gather patterns.

9. A non-transitory computer readable medium storing instructions for executing a process, the instructions comprising:
for a traffic specification comprising one or more transactions, each of the one or more transactions being specified using one or more groups of transmitting and receiving interfaces, wherein at least one of the one or more groups comprises a plurality of transmitting and receiving interfaces, identifying one or more valid sequences of messages between individual ones of the transmitting and receiving interfaces that can occur during Network on Chip (NoC) system operation, the identifying the one or more valid sequences of messages comprising:
for each transaction of the one or more transactions:
for each of the one or more groups in the each transaction, determining the individual ones of the transmitting and receiving interfaces from the each of the of the one more groups in the each transaction;
generating one or more valid instances of the each transaction from the individual ones of the transmitting and receiving interfaces for the each of the one or more groups of the each transaction; and
including the one or more valid instances of the each transaction in the valid sequences of messages.

10. The non-transitory computer readable medium of claim 9, wherein the identifying the one or more valid sequences of messages is based on determining hop types for each hop of the transactions.

11. The non-transitory computer readable medium of claim 10, wherein the determining hop types is based on at least one of a message type, identifying request and response pairs, identifying singleton endpoints, and definition provided in the traffic specification.

12. The non-transitory computer readable medium of claim 9, wherein the identifying the one or more valid sequences of messages comprises extending partial sequences based on destination filtering.

13. The non-transitory computer readable medium of claim 9, further comprising determining bandwidth requirements of the traffic specification for NoC design based on valid sequences and a bandwidth combining function.

14. The non-transitory computer readable medium of claim 9, further comprising providing instructions to a simulation tool based on conversion of the valid sequences into related messages.

15. The non-transitory computer readable medium of claim 14, wherein the instructions provided to a simulation tool utilize only a subset of the valid sequences.

16. The non-transitory computer readable medium of claim 9, wherein the one or more groups are marked to indicate the use of at least one of multicast, broadcast, and scatter-gather patterns, wherein the valid sequences comprise at least one of a valid multicast, broadcast, and scatter-gather patterns.

* * * * *